UNITED STATES PATENT OFFICE 2,624,738

PIPERIDINIUM COMPOUNDS

Moses Wolf Goldberg, Upper Montclair, and Lester Mischa Jampolsky, Clifton, N. J., assignors to Hoffmann-La Roche Inc., Nutley, N. J., a corporation of New Jersey No Drawing. Application December 20, 1951, Serial No. 262,682

10 Claims. (Cl. 260—293)

This invention relates to 4,4'-polymethylene-bis(1-lower alkyl-1-phenylalkylpiperidinium salts), wherein the polymethylene chain contains from 2 to 8 methylene groups, the alkyl portion of the phenylalkyl does not exceed 3 carbon atoms, and the phenyl portion of the phenylalkyl has a negative radical attached thereto selected from the group consisting of nitro, cyano, carbamyl, lower alkanoyl, lower carbalkoxy, and lower alkylsulfonyl. The compounds of the invention can be represented by the following formula:

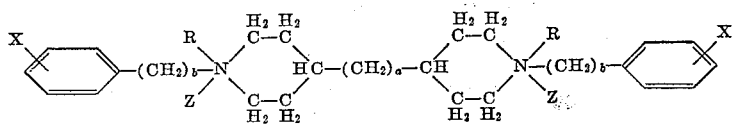

wherein $a$ represents an integer from 2 to 8; $b$ represents an integer from 1 to 3; R represents a lower alkyl radical; X represents nitro, cyano, carbamyl, lower alkanoyl, lower carbalkoxy or lower alkylsulfonyl; and Z represents an anion. The new compounds exhibit neuromuscular blocking activity and are useful as curare-like agents.

This application is a continuation-in-part of our copending applications, Serial No. 208,982, filed February 1, 1951, now abandoned, and Serial No. 232,464, filed June 19, 1951.

The new compounds can be prepared, for example, by quaternizing 4,4'-polymethylenebis(1-lower alkylpiperidines), wherein the polymethylene chain contains from 2 to 8 carbon atoms, with a phenyl alkyl halide, wherein the phenyl and alkyl portions are defined as hereinabove. The 4,4'-polymethylenebis(1-lower alkyl-1-phenylalkylpiperidinium halides) thus obtained can be readily converted into other salts, e. g., by converting the piperidinium halides into the piperidinium hydroxides and reacting the latter with an acid.

The 4,4'-polymethylenebis(1-lower alkylpiperidines) can, for example, be prepared by the catalytic hydrogenation of 4,4'-polymethylenebis-(1-lower alkylpyridinium halides), which are obtained by quaternizing 4,4'-polymethylene-bipyridines with a lower alkyl halide. The preparation of the 4,4'-polymethylene-bipyridines and the 4,4'-polymethylenebis(1-lower alkylpyridinium halides) is illustrated by the following examples:

EXAMPLE A

*4,4'-ethylenebis(1-methylpyridinium bromide)*

To 100 cc. of acetone containing 8.05 grams of 4,4'-ethylene-bipyridine were added 40 cc. of acetone containing 11 grams of methyl bromide. After standing in the dark at room temperature for three days, the crystals which formed were separated and recrystallized three times from methanol-ether. The purified 4,4'-ethylenebis-(1-methylpyridinium bromide) melted at 285–292° C. with decomposition.

EXAMPLE B

*4,4'-ethylenebis(1-propylpyridinium bromide)*

Ten grams of 4,4'-ethylene-bipyridine and 27 grams of n-propyl bromide were refluxed in 250 cc. of n-propanol for 20 hours. The clear solution was evaporated to dryness in vacuo. The residue was eluted with hot acetone and then crystallized from a mixture of methanol and ether. After four recrystallizations, the decomposition point of the 4,4'-ethylenebis(1-propylpyridinium bromide) remained constant at 251–253° C.

EXAMPLE C

*4,4'-ethylenebis(1-butylpyridinium bromide)*

A mixture of 10 grams of 4,4'-ethylene-bipyridine and 30 grams of n-butyl bromide in 75 cc. of butanol were refluxed for 20 hours. The reaction mixture was evaporated to dryness in vacuo and the residue so obtained was washed with hot acetone. The residue was then crystallized four times from a butanol-acetone mixture, whereupon the 4,4'-ethylenebis(1-butylpyridinium bromide) melted at 198–200° C. with decomposition.

EXAMPLE D

*4,4'-trimethylene-bipyridine*

84 grams of 4-vinyl-pyridine and 372 grams of dry 4-picoline were added to 80 cc. of benzene containing 20 mg. of hydroquinone. The solution was stirred and 1 gram of potassium was added, and the resulting solution refluxed at 105° C. for 45 minutes. The reaction mixture was cooled to 25° C. and the potassium destroyed with ethanol after which the benzene solution was extracted with water and with saturated sodium bisulfite solution. The benzene solution was dried and evaporated in vacuo. The oily residue was crystallized from acetone, yielding 4,4'-trimethylene-bipyridine, M. P. 57–60° C.

EXAMPLE E

*4,4'-trimethylenebis(1-methylpyridinium bromide)*

To 28.8 grams of 4,4'-trimethylene-bipyridine in 150 cc. of methanol were added 40 grams of methyl bromide in 125 cc. of acetone. After standing at 25° C. for 18 hours the reaction solution was evaporated to dryness in vacuo. The residue so obtained was crystallized from methanol-acetone. After 5 recrystallizations from methanol-acetone, the 4,4'-trimethylenebis(1-methylpyridinium bromide) thus obtained melted at 212–221° C. with decomposition.

EXAMPLE F

*4,4'-tetramethylene-bipyridine*

72 grams of 3-(4-pyridyl)-1-methoxy propane were refluxed with 700 cc. of 48% hydrobromic acid for four hours, and the reaction mixture was evaporated to dryness in vacuo at 100° C. The residue, 3-(4-pyridyl)-1-bromopropane hydrobromide, which consisted of a mass of hygroscopic needles, was directly converted into the unstable free base by dissolving it in ice water, adding solid potassium carbonate and extracting with ether. The ether solution was well dried, and an aliquot equivalent to 40 grams of 3-(4-pyridyl)-1-bromopropane was cooled to about −80° C. This was slowly added to a stirred liquid ammonia suspension of gamma-picoline potassium prepared by the addition of 20 grams of gamma-picoline to 2 liters of liquid ammonia containing 12 grams of potassium amide. The reaction mixture was stirred for three hours at about −30° C. and then the ammonia was allowed to evaporate. The residue so obtained was dissolved in water and extracted well with ether. The crystalline product, 4,4'-tetramethylene-bipyridine, obtained on evaporation of the dry ether extract, was recrystallized four times from methanol and from acetone, whereupon the melting point remained constant at 111–115° C.

EXAMPLE G

*4,4'-tetramethylenebis(1-methylpyridinium bromide)*

To 1 liter of acetone containing 25.3 grams of 4,4'-tetramethylenebipyridine were added 30 grams of methyl bromide in acetone. The precipitate which formed on allowing the reaction mixture to stand at room temperature for 18 hours was separated and crystallized from a methanol-acetone mixture. The hygroscopic crystals melted at 179° C.

EXAMPLE H

*4,4'-pentamethylene-bipyridine*

To about 2 liters of liquid ammonia, containing 26.3 grams of potassium amide, were added 47 grams of gamma-picoline and the mixture was stirred for 10 minutes at about −80° C. Fifty-one grams of trimethylene bromide in 250 cc. of ether were slowly added to the stirred mixture. After stirring for a few hours, ammonium chloride was added and the ammonia was allowed to evaporate. The residue was taken up in water and extracted with ether. The dried ether solution was evaporated to dryness at 100° C. in vacuo. The crystalline residue so obtained was recrystallized four times from a benzene-petroleum ether mixture, whereupon the melting point was constant at 51–56° C.

EXAMPLE I

*4,4'-pentamethylenebis(1-methylpyridinium bromide)*

To 250 cc. of acetone containing 41.6 grams of 4,4'-pentamethylenebipyridine were added 40 grams of methyl bromide in 200 cc. of acetone. The reaction mixture was allowed to stand in the dark at room temperature for 16 hours. The hygroscopic crystals which formed were then filtered off. They melted at 218–222° C. with decomposition.

EXAMPLE J

*4,4'-hexamethylene-bipyridine*

To 2.5 liters of liquid ammonia, containing 30 grams of potassium amide, were added 53 grams of gamma-picoline at about −80° C. and, after stirring for 15 minutes, 56 grams of tetramethylene dibromide were added. The stirring was continued for three hours at the same temperature, after which time the ammonia was allowed to evaporate. The residue was taken up in water and extracted with ether. The dried ether solution was evaporated, and the residue so obtained was distilled at 0.5 mm. The fraction boiling between 170–180° C. (0.5 mm.), 4,4'-hexamethylene-bipyridine, was converted immediately into the dimethobromide as in the following example.

EXAMPLE K

*4,4'-hexamethylenebis(1-methylpyridinium bromide)*

Sixty grams of 4,4'-hexamethylene-bipyridine were dissolved in 100 cc. of acetone and 150 grams of methyl bromide in 350 cc. of acetone were added. The crystals which formed on standing were filtered and recrystallized five times from methanol-acetone. They decomposed at 206–209° C.

EXAMPLE L

*4,4' - heptamethylene-bipyridine dihydrobromide*

To approximately 2 liters of liquid ammonia, containing 20.8 grams of potassium amide, were added 38 grams of gamma-picoline and the reaction mixture stirred for 15 minutes. Forty-eight grams of pentamethylene dibromide were carefully added at about −80° C. and the stirring continued for three hours at the same temperature. The ammonia was then allowed to evaporate, the residue taken up in water and extracted with ether. The dried ether solution was evaporated to dryness at 100° C. and 15 mm. The residue, 4,4' - heptamethylene - bipyridine, was converted to the dihydrobromide by means of 48% hydrobromic acid. After five crystallizations of this salt from ethanol, it melted at 209–211° C. with decomposition.

EXAMPLE M

*4,4'-octamethylene-bipyridine*

To about 2 liters of liquid ammonia, containing 20.8 grams of potassium amide, were added at about −80° C., 38 grams of gamma-picoline while stirring. After stirring for ten minutes, 55 grams of hexamethylene dibromide in 400 cc. of ether were slowly added. The mixture was stirred for another hour and then the ammonia was allowed to evaporate. The residue thus formed was dissolved in water, the solution made strongly alkaline by the addition of 6 N sodium hydroxide and extracted well with ether. The combined ether extracts were dried and evaporated to dryness. The residue was distilled at 0.2 mm. The 4,4'-octamethylene-bipyridine distilled between 242–251° C.

The dihydrobromide of 4,4'-octamethylenebipyridine was prepared by dissolving the free base in 40% hydrobromic acid and heating on the steam bath for five minutes. The crystals which formed on cooling were recrystallized four times from methanol. The purified material melted at 279–285° C. with decomposition.

EXAMPLE N

4,4'-octamethylenebis(1-methylpyridinium bromide)

Twenty-seven grams 4,4'-octamethylene-bipyridine were dissolved in 200 cc. of acetone, and 30 grams of methyl bromide in 250 cc. of acetone were added. After standing at 5° C., the crystals which had formed were separated and recrystallized three times from methanol-acetone. The purified compound melted at 282–288° C. with decomposition.

The preparation of the 4,4'-polymethylenebis-(1-alkylpiperidines) is illustrated by the following examples:

EXAMPLE 1

4,4'-ethylenebis(1-methylpiperidine)

5.87 grams of 4,4'-ethylenebis(1-methylpyridinium bromide) were hydrogenated in 180 cc. of methanol at room temperature and 1000 lbs./sq. inch pressure in the presence of 0.5 gram platinum oxide catalyst. After one hour, the catalyst was separated by filtration and the filtrate evaporated to dryness. The residue was dissolved in water, made strongly alkaline by the addition of sodium hydroxide solution and extracted with ether. Evaporation of the dried ether extracts yielded a crystalline residue which was recrystallized three times from acetonitrile. The purified product melted at 50–52° C.

EXAMPLE 2

4,4'-ethylenebis(1-propylpiperidine)

Twenty-one grams of 4,4-ethylenebis(1-propylpyridinium bromide) were dissolved in methanol and hydrogenated at a pressure of 1000 lbs./sq. inch in the presence of 1 gram of platinum oxide catalyst at room temperature. After the hydrogen uptake had ceased, the reaction mixture was filtered, acidified and evaporated to dryness in vacuo. The residue was dissolved in water, made strongly alkaline by the addition of 6 N sodium hydroxide solution and then extracted well with ether. The combined ether extracts were dried and evaporated. The residue was distilled at 0.35 mm. The fraction distilling at 125–131° C. [4,4'-ethylenebis(1-propylpiperidine)] was used directly for conversion into bis-quaternary salts.

The dihydrochloride of 4,4'-ethylenebis(1-propylpiperidine) was prepared by dissolving the base in methanol and adding an ether solution of hydrogen chloride. The precipitate which formed was crystallized four times from a methanol-ether mixture, whereupon the compound melted at 280–295° C. with decomposition.

EXAMPLE 3

4,4'-ethylenebis(1-butylpiperidine)

Twenty-four grams of 4,4'-ethylenebis(1-butylpyridinium bromide) were dissolved in methanol and hydrogenated at a pressure of 1000 lbs./sq. inch in the presence of 1 gram of platinum oxide catalyst at room temperature. After 2½ hours the hydrogen uptake had ceased. The catalyst was filtered, the filtrate acidified and evaporated to dryness in vacuo. The residue was dissolved in water, made strongly alkaline by the addition of 6 N sodium hydroxide and then extracted well with ether. The residue obtained on evaporation of the dried ether extract was distilled at 0.3 mm. The fraction distilling at 128–138° C. was used for the conversion into bisquaternary salts as described below.

The dihydrochloride of 4,4'-ethylenebis(1-butylpiperidine) was prepared by dissolving the free base in methanol and adding an ether solution of hydrogen chloride. The precipitate which formed was crystallized four times from a mixture of methanol and acetone. The purified salt melted at 265–272° C. with decomposition.

EXAMPLE 4

4,4'-trimethylenebis(1-methylpiperidine)

35 grams of 4,4'-trimethylenebis(1-methylpyridinium bromide) were dissolved in 625 cc. of methanol and hydrogenated in the presence of 3.5 grams of platinum oxide at 1,500 p. s. i. at 41° C. After the hydrogen uptake had ceased, the catalyst was filtered off and 20 cc. of 48% hydrobromic acid were added to the filtrate. The filtrate was evaporated to a volume of 200 cc., and acetone was added, whereupon 4,4'-trimethylenebis(1-methylpiperidinium) dihydrobromide precipitated. The crystalline precipitate was recrystallized from methanol and from methanol-ether, whereupon the product melted at 276–277° C. 30.6 grams of the dihydrobromide were dissolved in 100 cc. of water and the solution adjusted to pH 11 with 6 N sodium hydroxide. The alkaline solution was extracted with chloroform, and upon evaporation of the chloroform from the extract, the free base, 4,4'-trimethylenebis(1-methylpiperidine) was obtained as an oil.

EXAMPLE 5

4,4'-tetramethylenebis(1-methylpiperidine)

Forty-one grams of 4,4'-tetramethylenebis(1-methylpyridinium bromide) were hydrogenated in 200 cc. of methanol at room temperature and 1000 lbs./sq. inch pressure with 1 gram of platinum oxide catalyst. After two hours the catalyst was separated by filtration, the filtrate acidified with concentrated hydrochloric acid and evaporated to dryness at 100° C. and 15 mm. The residue was taken up in water, the solution made alkaline by the addition of 6 N sodium hydroxide and extracted with ether. The ether was dried and evaporated. The residue was crystallized twice from acetone, whereupon the compound melted at 61–63° C.

EXAMPLE 6

4,4'-pentamethylenebis(1-methylpiperidine)

Twenty-eight grams of 4,4'-pentamethylenebis(1-methylpyridinium bromide) were dissolved in methanol and hydrogenated at a pressure of 1000 lbs./sq. inch at room temperature in the presence of 2 grams of platinum oxide catalyst. After the hydrogen uptake had ceased, the reaction mixture was filtered, acidified and evaporated to dryness in vacuo. The residue was dissolved in water, the solution made strongly alkaline and extracted well with ether. The combined ether extracts were dried and evaporated. This residue was distilled and the fraction boiling between 112-118° C. (0.7 mm.) was dissolved in petroleum ether and passed through an alumina column to remove impurities. The purified oily material, which was obtained by the evaporation of the solution, was 4,4'-pentamethylenebis(1-methylpiperidine). Its dipicrate was prepared as follows:

To an ether solution of 0.37 gram of 4,4'-pentamethylenebis(1-methylpiperidine) was added a saturated ether solution of picric acid. The oily solid which formed on standing was separated and crystallized four times from acetone-ether. The crystalline dipicrate decomposed at 204-206° C.

EXAMPLE 7

4,4'-pentamethylenebis(1-methylpiperidine) dihydrochloride 20.4 grams of 4,4'-pentamethylenebis(1-methylpyridinium bromide) were dissolved in 240 cc. of methanol and hydrogenated at a pressure of 1000 lbs./sq. inch and 25° C. for 30 minutes in the presence of 2 grams of platinum oxide catalyst. The filtered hydrogenation solution was acidified with 6 N hydrochloric acid, evaporated to dryness, the residue taken up in water, the solution made alkaline and extracted well with ether. The residue obtained by evaporation of the dried ether solution was distilled in vacuo. A portion of the material distilling at 123-126° C. (0.35 mm.) was dissolved in methanol and a solution of hydrochloric acid in ether added. The crystals which formed were recrystallized three times from methanol-ether. Melting point 239-242° C. with decomposition. The compound tends to retain water of crystallization.

EXAMPLE 8

4,4'-hexamethylenebis(1-methylpiperidine)

Fifty-nine grams of 4,4'-hexamethylenebis(1-methylpyridinium bromide) were hydrogenated in 200 cc. of methanol at room temperature and 1000 lbs./sq. inch pressure in the presence of 2 grams of platinum oxide catalyst. After one hour, the catalyst was separated by filtration, the filtrate acidified with concentrated hydrochloric acid and evaporated to dryness at 100° C. and 15 mm. pressure. The residue was taken up in water, the solution made alkaline by the addition of 6 N sodium hydroxide and extracted with ether. The ether solution was dried and evaporated. The crystalline residue was recrystallized from acetonitrile and from acetone. The purified material melted at 42° C.

EXAMPLE 9

4,4'-heptamethylenebis(1-methylpiperidine) dihydrochloride

Twenty-seven grams of 4,4'-heptamethylene-bipyridine were dissolved in 150 cc. of acetone and 23 grams of methyl bromide in 142 cc. of acetone were added. After standing 18 hours at room temperature, the 4,4'-heptamethylenebis(1-methylpyridinium bromide), which had formed as a dark colored oil, was separated, dissolved in methanol and hydrogenated at room temperature and 1000 lbs./sq. inch pressure in the presence of 1.5 grams of platinum oxide catalyst.

The filtered hydrogenation solution was acidified with 6 N hydrochloric acid, evaporated to dryness, the residue taken up in water, the solution made strongly alkaline with 6 N sodium hydroxide and extracted well with ether. One gram of the 4,4'-heptamethylenebis(1-methylpiperidine) obtained by evaporation of the dried ether extract was dissolved in 15 cc. of alcohol and an excess of hydrochloric acid dissolved in ether was added. The solution was evaporated to dryness and the residue crystallized from aqueous acetone and from methanol-acetone. The dihydrochloride melted at 226-229° C. with decomposition. It tends to retain water of crystallization.

EXAMPLE 10

4,4'-octamethylenebis(1-methylpiperidine)

Forty-one grams of crude 4,4'-octamethylenebis(1-methylpyridinium bromide) were dissolved in 175 cc. of methanol and hydrogenated in the presence of 1 gram of platinum oxide catalyst at a pressure of 1000 lbs./sq. inch and room temperature. After the hydrogen uptake had ceased, the solution, containing some crystalline material, was warmed and filtered. The filtrate was acidified with hydrochloric acid and evaporated to dryness in vacuo. The residue so obtained was dissolved in water, the solution made strongly alkaline by addition of 6 N sodium hydroxide and then extracted well with ether. The crystalline residue obtained by evaporation of the dried ether extract was recrystallized from acetone and from acetonitrile whereupon it melted at 40-43° C.

EXAMPLE 11

4,4'-ethylenebis[1-(p-nitrophenethyl) piperidine]

To 200 cc. of benzene containing 2.9 grams of 4,4'-ethylene-bipiperidine were added 3.4 grams of p-nitrophenethyl bromide in 100 cc. of benzene. The mixture was stirred and refluxed for 2½ hours, allowed to stand at 25° C. for 18 hours, and the solids which formed were filtered off. The filtrate was refluxed for 4 periods of 3 hours each, the solids being filtered off after each period. The final filtrate was evaporated to dryness in vacuo. The residue was eluted with dry acetone. The yellow crystals which formed on concentrating the acetone eluate were recrystallized from acetone and from a chloroform-ether mixture. The 4,4'-ethylenebis[1-(p-nitrophenethyl)piperidine] thus obtained melted at 171-172° C.

EXAMPLE 12

4,4'-trimethylenebis[1-(p-nitrophenethyl) piperidine]

28.8 grams of 4,4'-trimethylene-bipyridine were dissolved in 100 cc. of 6 N hydrochloric acid and hydrogenated at 1,500 lbs./sq. inch at 50° C. in the presence of 2 grams of platinum oxide. After the hydrogen uptake had ceased, the catalyst was filtered and the filtrate made strongly alkaline with 30% sodium hydroxide solution. The resulting mixture was extracted with chloroform and the dried chloroform extracts combined and evaporated to dryness in vacuo. The crystalline residue was recrystallized from acetone, yielding 4,4'-trimethylene-bipiperidine. The free base was converted into the dihydrochloride by treating the base dissolved in methanol with hydrogen chloride in ether. After two recrystallizations from methanol-ether, the dihydrochloride melted at 265–269° C. with decomposition.

To a stirred and refluxing solution of 14.9 grams of 4,4'-trimethylene-bipiperidine in 250 cc. of benzene there was slowly added over a period of one hour a solution of 16.5 grams of p-nitrophenethyl bromide in 250 cc. of benzene. The reaction mixture was then refluxed for 22 hours and the solids which formed were separated by filtration. The filtrate was extracted with 3 N hydrochloric acid, the aqueous extract was made strongly alkaline by the addition of sodium hydroxide and then extracted with chloroform. The chloroform extract was dried and evaporated to dryness in vacuo and the residue so obtained was crytallized from acetone-petroleum ether. The 4,4'-trimethylenebis[1-(p-nitrophenethyl)-piperidine] thus obtained melted at 98–99° C.

The preparation of the 4,4'-polymethylenebis-(1-lower alkyl-1-phenylalkylpiperidinium salts) is illustrated by the following examples:

EXAMPLE I

*4,4'-ethylenebis[1-(p-nitrobenzyl)-1-methyl-piperidinium bromide]*

To 10 cc. of benzene containing 980 mg. of 4,4'-ethylenebis(1-methylpiperidine) were added 1.7 grams of p-nitrobenzyl bromide in 25 cc. of benzene. The mixture was warmed a few minutes on a water bath and then allowed to stand at room temperature for 40 hours. The crystals which formed were filtered and recrystallized from water and from methanol. The purified material melted at 264° C. with decomposition.

EXAMPLE II

*4,4'-ethylenebis[1-(p-nitrobenzyl)-1-methyl-piperidinium chloride]*

Three grams of 4,4'-ethylenebis(1-methylpiperidine) were dissolved in 100 cc. of benzene. To the resulting solution were added 5 grams of p-nitrobenzyl chloride in 100 cc. of benzene. The mixture was refluxed for 1 hour. After evaporation of the mixture, the residue was crystallized from methanol and from dilute acetone. The crystalline product melted at 264–267° C. with decomposition.

EXAMPLE III

*4,4'-ethylenebis[1-(p-nitrobenzyl)-1-methyl-piperidinium nitrate]*

One gram of 4,4'-ethylenebis[1-(p-nitrobenzyl)-1-methylpiperidinium bromide] was dissolved in 100 cc. of water at 80° C. 352 mg. of silver oxide were added and the mixture shaken for 10 minutes at 60° C. An additional 352 mg. of silver oxide were added and the mixture shaken again for 10 minutes. After filtering, the solution was acidified by the addition of 16.5 cc. of 0.15 N nitric acid. The solution was evaporated to dryness in vacuo and the residue so obtained was crystallized from methanol. After three crystallizations the product melted at 240–242° C. with decomposition.

EXAMPLE IV

*4,4'-ethylenebis[1-(m-nitrobenzyl)-1-methyl-piperidinium bromide]*

To 5.12 grams of 4,4'-ethylenebis(1-methylpiperidine) in 200 cc. of benzene were added 8.6 grams of m-nitrobenzyl bromide in 50 cc. of benzene. After refluxing for three hours, the crystals which formed were filtered and recrystallized from dilute acetone. The colorless crystals melted at 256–264° C. with decomposition.

EXAMPLE V

*4,4'-ethylenebis[1-(p-nitrobenzyl)-1-ethyl-piperidinium bromide]*

To 50 cc. of benbene containing 2.5 grams of 4,4'-ethylenebis(1-ethylpiperidine) were added 4.2 grams of p-nitrobenzyl bromide in 50 cc. of benzene. The solution was refluxed for ½ hour and the reaction mixture was allowed to stand at 25° C. for 16 hours. The precipitate which formed was filtered off and crystallized three times from ethanol. The product thus obtained melted at 249° C. with decomposition.

EXAMPLE VI

*4,4'-ethylenebis[1-(p-cyanobenzyl)-1-methyl-piperidinium chloride]*

To 50 cc. of benzene containing 4.5 grams of 4,4'-ethylenebis(1-methylpiperidine) were added 6.1 grams of p-cyanobenzyl chloride in 50 cc. of benzene. The solution was refluxed for one hour and then allowed to stand at 25° C. for 18 hours. The small amount of crystals which had formed were filtered off and the filtrate evaporated to dryness in vacuo. The residue was crystallized three times from methanol-ether, whereupon the compound melted at 271–274° C. with decomposition.

EXAMPLE VII

*4,4'ethylenebis[1-(p-nitrobenzyl)-1-propyl-piperidinium bromide]*

Five grams of 4,4'-ethylenebis(1-propyl-piperidine) in 75 cc. of benzene were mixed with 8.41 grams of p-nitrobenzyl bromide in 75 cc. of benzene and the mixture allowed to stand at room temperature for 18 hours. The solids which had formed were separated and crystallized from dilute acetone and from a mixture of methanol, acetone and ether. The purified product melted at 221–223° C. with decomposition.

EXAMPLE VIII

*4,4'-ethylenebis[1-(p-nitrobenzyl)-1-butyl-piperidinium bromide]*

To 300 cc. of benzene containing 4.0 grams of 4,4'-ethylenebis(1-butylpiperidine) were added 5.8 grams of p-nitrobenzyl bromide. The mixture was refluxed for 1 hour, allowed to stand at room temperature for 16 hours, and the benzene decanted from the oily solids which had formed. These solids were eluted with boiling acetone, and then crystallized from a mixture of methanol, acetone and ether. The product melted at 209–218° C. with decomposition.

EXAMPLE IX

*4,4'-tetramethylenebis[1-(p-nitrobenzyl)-1-methylpiperidinium bromide]*

Five and one-half grams of 4,4'-tetramethylenebis(1-methylpiperidine) in 175 cc. of benzene were refluxed together with 9.3 grams of p-nitrobenzyl bromide for ½ hour. The solids which formed were filtered and crystallized 5 times from methanol-ether, methanol and dilute methanol. The purified material melted at 235–236° C. with decomposition. It tends to retain water of crystallization.

EXAMPLE X

*4,4' - hexamethylenebis[1 - (p - nitrobenzyl) - 1-methylpiperidinium bromide]*

Four grams of 4,4' - hexamethylenebis(1-methylpiperidine) and 6.2 grams of p-nitrobenzyl bromide were refluxed together in 150 cc. of acetone for ten minutes. The reaction mixture was allowed to stand at room temperature for a few hours, and the crystals which formed were filtered and recrystallized from methanol and methanol-ether. After 5 recrystallizations, the melting point was constant at 241–245° C. with decomposition.

EXAMPLE XI

*4,4' - heptamethylenebis[1 - (p - nitrobenzyl) - 1-methylpiperidinium bromide]*

Two grams of 4,4'-heptamethylenebis(1-methylpiperidine) in 20 cc. of benzene were added to a solution of 3.24 grams of p-nitrobenzyl bromide in 50 cc. of benzene. After standing for 24 hours at room temperature, the crystals which formed were separated and recrystallized from ethanol-ether. The compound melted at 220–222° C. with decomposition.

EXAMPLE XII

*4,4' - trimethylenebis[1 - (p - nitrobenzyl) - 1-methylpiperidinium bromide]*

To 3 grams of 4,4'-trimethylenebis(1-methylpiperidine) in 100 cc. of benzene were added 5.4 grams of p-nitrobenzyl bromide in 100 cc. of benzene. After refluxing for one-half hour, the reaction mixture was allowed to stand at 25° C. for 60 hours, and the precipitate which had formed was separated. The precipitate was crystallized from a mixture of methanol-ether and recrystallized from methanol. The 4,4'-trimethylenebis[1 - (p - nitrobenzyl) - 1 - methylpiperidinium bromide] was obtained in the form of pale yellow crystals which melted at 250–253° C. with decomposition.

EXAMPLE XIII

*4,4' - ethylenebis[1 - (p - carbamylbenzyl) - 1-methylpiperidinium chloride]hemihydrate*

400 cc. of methanol containing 4.97 grams of 4,4'-ethylenebis(1-methylpiperidine) and 6.80 grams of p-chloromethylbenzamide were refluxed for 4 hours and then allowed to stand for 18 hours at 25° C. Ether was added and the precipitate which formed was treated with decolorizing charcoal in methanol and then reprecipitated with ether. The 4,4'-ethylenebis[1-(p-carbamylbenzyl)-1-methylpiperidinium chloride]-hemihydrate thus obtained was crystallized from methanol-ether whereupon it melted at 288–290° C. with decomposition.

EXAMPLE XIV

*4,4' - ethylenebis[1 - methyl - 1 - (p - carbethoxybenzyl)piperidinium chloride] monohydrate*

To 1.7 grams of 4,4'-ethylenebis(1-methylpiperidine) in 100 cc. of benzene were added 3 grams of p-chloromethyl benzoic acid ethyl ester. After refluxing for 2 hours, the reaction mixture was evaporated to dryness and the residue crystallized from ethanol-ether. The 4,4'-ethylenebis[1 - methyl - 1 - (p - carbethoxybenzyl)piperidinium chloride]monohydrate thus obtained melted at 262–264° C. with decomposition.

EXAMPLE XV

*4,4' - ethylenebis[1 - (p - acetylbenzyl) - 1-methylpiperidinium bromide]*

2.2 grams of 4,4'-ethylenebis(1-methylpiperidine) and 4.2 grams of p-acetylbenzyl bromide were each dissolved in 50 cc. of benzene. The two solutions were combined and then heated on the steam bath for a few minutes, after which a precipitate began to form. The reaction mixture was allowed to stand at 25° C. for 18 hours, after which the precipitate was separated and crystallized from dilute methanol. The 4,4'-ethylenebis[1 - (p - acetylbenzyl) - 1 - methylpiperidinium bromide] thus obtained melted at 281–286° C.

EXAMPLE XVI

*4,4' - ethylenebis[1 - (p - nitrophenethyl) - 1-methylpiperidinium bromide]*

To 270 mg. of 4,4'-ethylenebis(1-p-nitrophenethylpiperidine) in 10 cc. of a 1:1 chloroform-benzene solution were added 3.2 grams of methyl bromide in acetone. The yellow crystals which formed on standing were separated and recrystallized twice from water. The 4,4'-ethylenebis-[1 - (p - nitrophenethyl) - 1 - methylpiperidinium bromide] thus obtained melted at 284–288° C. with decomposition.

EXAMPLE XVII

*4,4' - trimethylenebis[1 - (p - nitrophenethyl)-1-methylpiperidinium bromide]*

One gram of 4,4'-trimethylenebis[1-(p-nitrophenethyl) piperidine] was dissolved in 10 cc. of chloroform and the solution diluted to a volume of 100 cc. with acetone. 1.5 gms. of methyl bromide in 15 cc. of acetone were added. After standing at 25° C. for 18 hours, the supernatant liquid was decanted from the oily solid which had formed. The oily solid was crystallized from a mixture of methanol, acetone and ether. The product was recrystallized from methanol-acetone. The 4,4' - trimethylenebis[1 - (p - nitrophenethyl) - 1 - methylpiperidinium bromide] thus obtained melted at 184–186° C. with decomposition.

EXAMPLE XVIII

*4,4' - ethylenebis[1 - (p - nitrophenethyl) - 1-ethylpiperidinium bromide]sesquihydrate*

To 4.5 grams of 4,4' - ethylenebis[1 - (p - nitrophenethyl)piperidine] in 50 cc. of chloroform were added 28 grams of ethyl bromide. The reaction mixture was kept at 100° C. for 14 hours in a sealed tube after which it was cooled. The crystals which had formed were separated and recrystallized from water. The 4,4'-ethylenebis-[1 - (p - nitrophenethyl) - 1 - ethylpiperidinium bromide]sesquihydrate thus obtained melted at 218–220° C. with decomposition.

EXAMPLE XIX

*4,4'-ethylenebis [1-(p-nitrophenylpropyl)-1-methylpiperidinium bromide]*

To 3.2 grams of 4,4'-ethylenebis(1-methylpiperidine) in 50 cc. of benzene were added 50 cc. of benzene containing 7 grams of 1-bromo-3-(p-nitrophenyl) propane. After refluxing for 5 hours, the reaction mixture was evaporated to dryness in vacuo. The crystalline residue was recrystallized from dilute methanol. The 4,4'-ethylenebis[1 - (p - nitrophenylpropyl) - 1-methylpiperidinium bromide] thus obtained melted at 278–286° C. with decomposition.

EXAMPLE XX

*4,4'-ethylenebis[1-(p-methylsulfonylbenzyl)-1-methylpiperidinium chloride]*

To 4 grams of p-methylsulfonylbenzyl chloride in 100 cc. of benzene were added 2.2 grams of 4,4'-ethylenebis(1-methylpiperidine) in 100 cc. of benzene. The solution was refluxed for 2 hours, and the reaction mixture was evaporated to dryness in vacuo. The residue was crystallized from a mixture of methanol-acetone and ether. The 4,4' - ethylenebis[1-(p-methylsulfonylbenzyl) - 1 - methyl-piperidinium chloride] melted at 276–286° C. with decomposition.

The p-methylsulfonylbenzyl chloride was prepared in the following manner:

16.8 grams of p-methylmercaptobenzoic acid were reduced with 9.1 grams of lithium aluminum hydride suspended in 500 cc. of absolute ether, by Soxhlet extraction. The total reflux time was 6½ hours. The reaction mixture was cooled and water added dropwise until no further reaction was evident. 170 cc. of 15% sodium hydroxide were added, and the resulting gel which formed was centrifuged, the ether layer separated, and the gel extracted with fresh portions of ether. The combined ether extracts were washed with water, dried over sodium sulfate, and the ether evaporated. The residual orange oil was fractionally distilled in vacuo to yield an orange oil, B. P. 108–109° C. at 0.4 mm., which solidified, M. P. 41–42° C. Recrystallization from ether-petroleum ether gave pale yellow crystals of p-methylmercaptobenzyl alcohol, M. P. 41–42° C.

To a stirred solution of 7.3 grams of p-methylmercaptobenzyl alcohol in 10 cc. of dry chloroform maintained at 4° C. were added over a period of one hour, 4.9 cc. of thionyl chloride dissolved in 5 cc. of dry chloroform. After stirring for 1 hour at 4° C. and then for 3 hours at room temperature, the chloroform and excess thionyl chloride were removed under vacuum and the residual orange oil fractionally distilled in vacuo to yield p-methylmercaptobenzyl chloride as a colorless oil, B. P. 83° C. at 0.3 mm., $n_D^{27}=1.6034$.

To a solution of 1.7 grams of p-methylmercaptobenzyl chloride in 10 cc. of glacial acetic acid were added at 10° C. over a period of 10 minutes, 3 grams of 30% hydrogen peroxide. To the solution, after storage first at 10° C. for ½ hour and then at room temperature for 24 hours, were slowly added 20 cc. of water. The resulting crystalline precipitate was filtered off, washed with water, and dried, yielding p-methylsulfonylbenzyl chloride which on recrystallization from acetone-hexane gave white crystals, M. P. 81–82° C.

It will be understood that the above examples are merely illustrative and that any of the above-mentioned 4,4'-polymethylenebis(1-lower alkylpiperidines) can be quaternized with any of the aforementioned phenylalkyl halides, to produce the corresponding 4,4'-polymethylenebis(1-lower alkyl-1-phenylalkylpiperidinium halides) wherein the phenyl and alkyl portions, and polymethylene chain are defined as hereinabove. Our invention also embraces the compounds in all stereoisomeric forms, as well as the anhydrous and hydrated forms, and the claims are to be so construed.

We claim:

1. 4,4' - polymethylenebis(1 - lower alkyl - 1 - phenylalkylpiperidinium salts), wherein the polymethylene chain contains from 2 to 8 methylene groups, and the alkyl portion of the phenylalkyl does not exceed three carbon atoms, and the phenyl portion of the phenylalkyl has attached thereto a negative radical selected from the group consisting fo nitro, cyano, carbamyl, lower alkanoyl, lower carbalkoxy, and lower alkylsulfonyl.

2. 4,4' - polymethylenebis(1 - lower alkyl - 1-nitrophenylalkylpiperidinum halides) wherein the polymethylene chain contains from 2 to 8 methylene groups, and the alkyl portion of the phenylalkyl does not exceed 3 carbon atoms.

3. 4,4' - polymethylenebis(1 - lower alkyl - 1 - cyanophenylalkylpiperidinium halides), wherein the polymethylene chain contains from 2 to 8 methylene groups and the alkyl portion of the phenylalkyl does not exceed 3 carbon atoms.

4. 4,4' - polymethylenebis(1 - lower alkyl - 1 - carbamylphenylalkylpiperidinium halides), wherein the polymethylene chain contains from 2 to 8 methylene groups and the alkyl portion of the phenylalkyl does not exceed 3 carbon atoms.

5. 4,4' - polymethylenebis(1 - lower alkyl - 1 - lower alkanoylphenylalkylpiperidinium halides), wherein the polymethylene chain contains from 2 to 8 methylene groups and the alkyl portion of the phenylalkyl does not exceed 3 carbon atoms.

6. 4,4' - ethylenebis[1 - (p - nitrobenzyl) - 1 - methylpiperidinium bromide].

7. 4,4' - ethylenebis[1 - (p - nitrophenethyl) - 1 - methylpiperidinium bromide].

8. 4,4' - ethylenebis[1 - (p - cyanobenzyl) - 1 - methylpiperidinium chloride].

9. 4,4' - ethylenebis[1 - (p - carbamylbenzyl) - 1 - methylpiperidinium chloride].

10. 4,4' - ethylenebis[1 - ( p - acetylbenzyl) - 1 - methylpiperidinium bromide].

MOSES WOLF GOLDBERG.
LESTER MISCHA JAMPOLSKY.

REFERENCES CITED

The following references are of record in the file of this patent:

Thayer: J. Am. Chem. Soc., vol. 70, pages 2330–2333 (1948).